United States Patent [19]

Gewelber

[11] Patent Number: 5,192,623
[45] Date of Patent: Mar. 9, 1993

[54] LAMINATED STRUCTURAL PANELS AND THE METHOD OF PRODUCING THEM

[75] Inventor: Ytzhak Gewelber, La Mirada, Calif.

[73] Assignee: Lockhart Industries, Paramount, Calif.

[21] Appl. No.: 917,511

[22] Filed: Jul. 16, 1992

Related U.S. Application Data

[63] Continuation of Ser. No. 602,011, Oct. 23, 1990, abandoned.

[51] Int. Cl.⁵ .............................. B32B 3/12; B32B 3/30
[52] U.S. Cl. ...................................... 428/593; 228/181; 228/190; 52/794; 52/806
[58] Field of Search ............... 228/181, 190; 428/593, 428/586; 52/794, 806

[56] References Cited

U.S. PATENT DOCUMENTS

| | | | |
|---|---|---|---|
| 3,073,268 | 1/1963 | Cole | 228/181 |
| 3,084,770 | 4/1963 | Winsing | 52/806 |
| 3,106,016 | 10/1963 | Warren | 228/181 |
| 3,110,961 | 11/1963 | Mellil et al. | 228/181 |
| 4,035,536 | 7/1977 | Morrison | 428/593 |
| 4,465,725 | 8/1984 | Riel | 52/806 |

FOREIGN PATENT DOCUMENTS 2056888A 3/1981 United Kingdom ............... 228/181

OTHER PUBLICATIONS

Metals Handbook, 9th Ed., vol. 6 "Welding, Brazing and Soldering", American Society for Metals, pp. 1022–1032.

*Primary Examiner*—John Zimmerman
*Attorney, Agent, or Firm*—Wagner & Middlebrook

[57] ABSTRACT

Laminated structural panels and the method of producing them involve selection of a desired member of sheets of sheet metal of the desired thickness and material, perforating one or more of the sheets to a desired pattern depending upon characteristics desired such as lightness, stiffness or inclusion of fluid passageways etc., stacking the perforated sheets with imperforate face sheets top and bottom and, with brazing material at the interface between the sheets, subjecting the stack to a temperature high enough to cause melting of the brazing material while maintaining a very high vacuum environment. In an alternative embodiment, one or more imperforate internal sheets may be interleaved between the perforated sheets.

25 Claims, 2 Drawing Sheets

LAMINATED STRUCTURAL PANELS AND THE METHOD OF PRODUCING THEM

This is a continuation of copending application Ser. No. 07/602,011 filed on Oct. 23, 1990 now abandoned.

This invention relates to a method for producing laminated structural panels and the resulting panels.

BACKGROUND OF THE INVENTION

There has long been a need for materials which combine the desirable qualities of reasonable strength, good stiffness and load carrying ability, and good sound and temperature insulation with substantially less weight than solid members of the same materials. Most of such structures are of a type known as honeycomb materials. Such materials are often formed of numerous connected cells of organic material such as paper or wood as the internal structure with wood, glass fiber, or metal exterior plates fastened to the ends of the cells, typically with a suitable glue such as an epoxy resin. All metal honeycomb structure is also known wherein interconnected cells of thin wall metal are fastened by suitable means, to exterior plates. Such a honeycomb structure is shown and described in U.S. Pat. No. 4,013,210. This patent also describes a vacuum diffusion bonding process for fastening the metal honeycomb structure to face sheets or plates. The process and resulting product seem to be directed principally to forming titanium bodies. Other patents teach the use of epoxy of some type as the bonding media, e.g. U.S. Pat. Nos. 4,692,367 and 4,063,981. U.S. Pat. No. 4,622,445 teaches a process for brazing a metal face sheet to a honeycomb core wherein a brazing alloy is placed between the face sheet and the core and the face sheet pressed to the core with a piece of thermal insulation while the metal parts are heated to a temperature just sufficient to melt the brazing alloy. An inert gas is provided as an environment during the heating process.

The problem with such honeycomb structures is that, in general, they are relatively fragile; if bonded with epoxy they are quite limited in the temperature and atmospheric pressure changes to which they may be exposed, they cannot normally be made thinner than about 0.25 inch, and once so constructed they cannot be processed further to conform to other shapes, as by rolling, forming, bending, etc. Due to temperature or pressure stress, delamination often occurs causing moisture absorption resulting in internal corrosion. There is a need for an all metal laminated structure providing good sound and thermal insulation which is essentially as strong as a homogeneous metal panel of the same thickness, but substantially lighter in weight, which is essentially immune to internal corrosion, which can be subjected to essentially all the same metal forming processes as homogeneous metal, which may be repaired or fabricated by welding similarly to homogeneous metal, and in which any cuts or punctures affect only the cells directly involved because each entrained cell is effectively vacuum sealed from all the others.

BRIEF DESCRIPTION OF THE INVENTION

The method and resulting structural panels described herein utilize a stack of metal plates wherein the face plates, or top and bottom plates are solid and the center plates are perforated to produce a substantial number of openings. The perforations may be formed by drilling, cutting, chemical etching, stamping or other machining processes capable of producing the desired pattern of openings. The process described herein is applicable to many combinations of metals, which may be selected according to the application for the panel. As an example, a typical panel may be formed with top and bottom face sheets and center sheets of aluminum which may be clad with an aluminum brazing material or the sheets may be interleaved with aluminum brazing foil.

The stack is then placed in an oven and brazed at a high vacuum and at a temperature sufficient to melt the brazing material. The brazing process itself is known and those skilled in the art will be aware of suitable temperatures and vacuum values for brazing other materials.

By selecting a pattern of perforations and number of internal layers, laminated panels may be made as thin as 0.010 inch or substantially thicker as desired. They may be laminated with fluid channels to conduct coolant or lubricants and they may be subjected to additional metal working steps such as welding, stamping, sawing, forming, rolling, etc., in essentially the same manner as homogeneous metal panels.

DESCRIPTION OF THE PREFERRED EMBODIMENT

Figure 1:
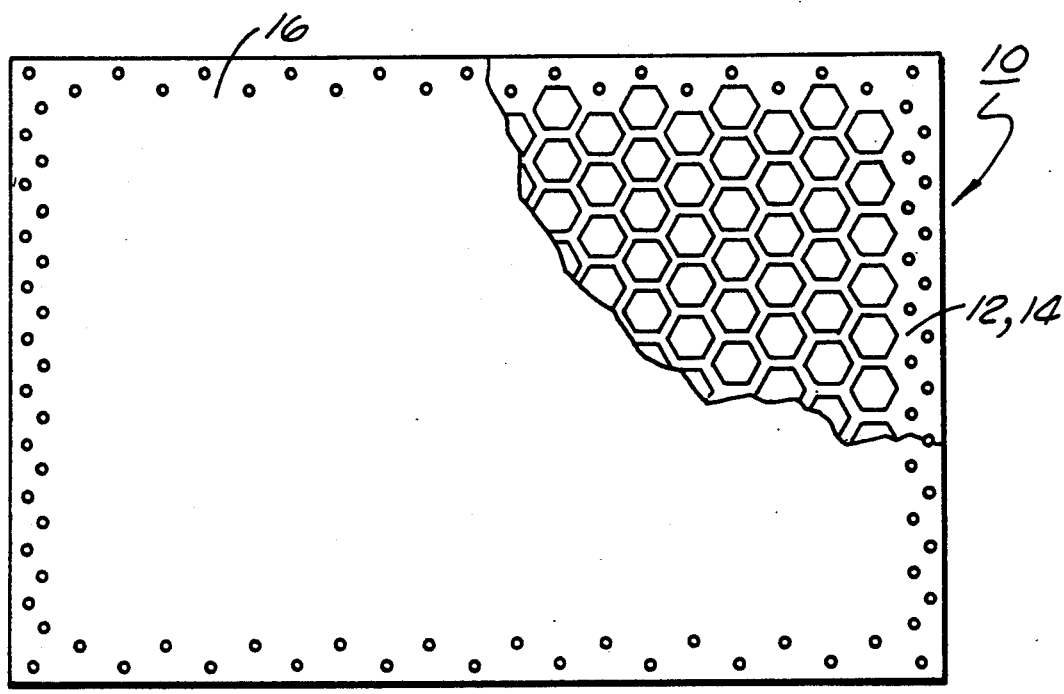
FIG. 1 is a plan view, partly broken away, of a lightweight structural panel formed according to my invention.
Figure 2:
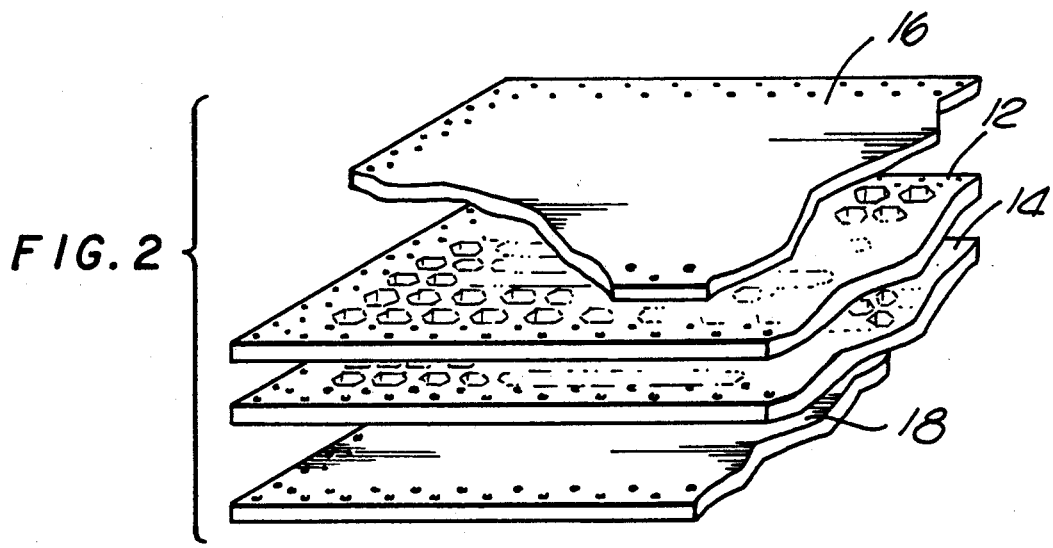
FIG. 2 is a fragmentary exploded view of the structural panel of FIG. 1.

Referring now to FIG. 1, a laminated panel 10 is described and according to my invention includes a plurality of sheets of aluminum alloy 12 which are perforated to a desired pattern and which are joined using a brazing process to an upper face sheet 16 and a bottom or lower face sheet 18 (FIG. 2). The pattern of perforation and the number of perforated sheets may be selected to control the density or stiffness of the panel 10. FIG. 2 is an exploded view, partly broken away, of a simple laminated structure such as shown in FIG. 1 formed of four sheets 12, 14, 16 and 18 of aluminum alloy, the center ones 12 and 16 being perforated and either clad with aluminum brazing material or interleaved with aluminum brazing foil as described above.

Figure 3:
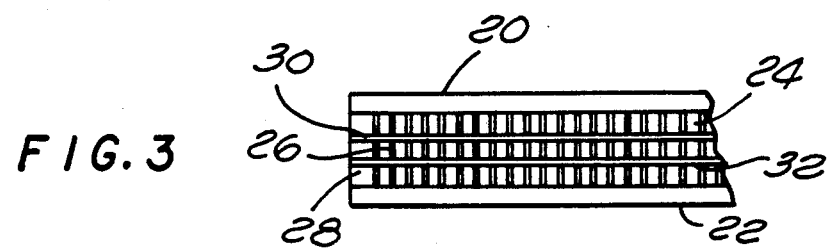
FIG. 3 is a partial edge view of an alternate form of structural panel according to my invention.

FIG. 3 is a fragmentary cross sectional view of a laminated structure formed of several layers, but which, in plan view could appear similar to FIG. 1. In FIG. 3 are shown face sheets 20 and 22, perforated sheets 24, 26 and 28 and a pair of unperforated sheets 30 and 32 interleaved between the perforated sheets. All of these stacked sheets are brazed together to provide a comparatively lightweight structure which is quite stiff and strong and which can be further processed in essentially the same manner as could a solid sheet of the same aluminum alloy. The use of the unperforated internal sheets is optional and would depend on requirements.

Figure 4:
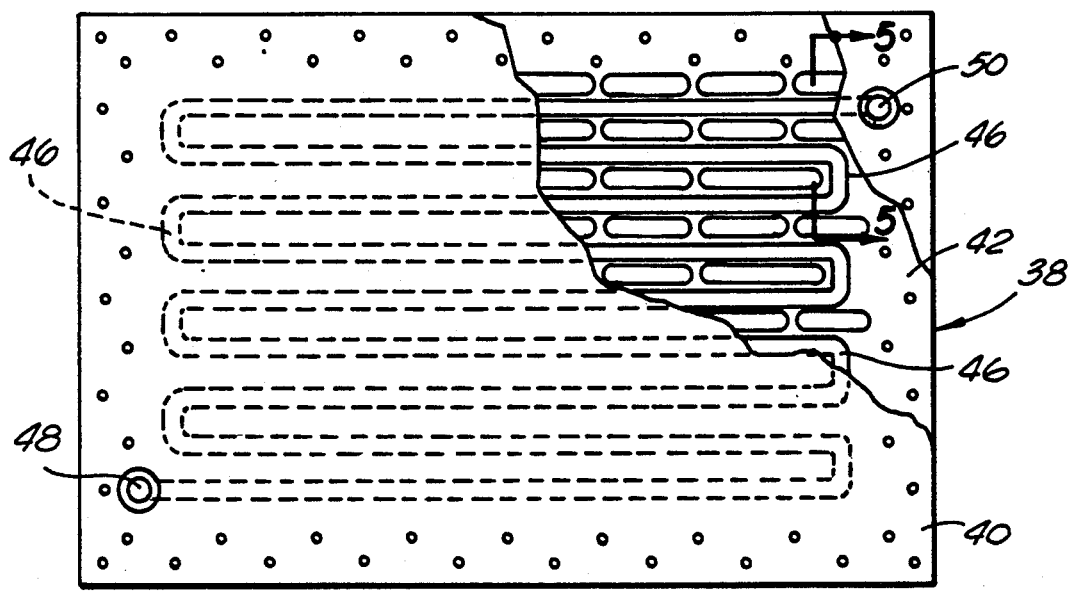
FIG. 4 is a plan view, partly broken away, of another embodiment of my invention.
Figure 5:
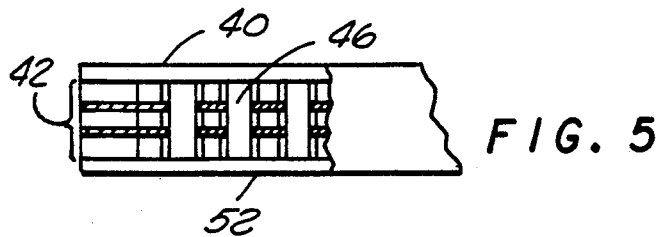
FIG. 5 is a sectional view taken along line 5—5 of FIG. 4.

FIG. 4 is a plan view, with the top sheet partly broken away and with other parts shown in phantom, of another embodiment of my invention of my invention. This laminated stacked assembly 38 includes a top face sheet 40, a bottom face sheet (not shown) and one or a plurality of internal sheets 42 which are stacked and brazed together with the face sheets to form a panel permitting the passage of a liquid such as a lubricant or a coolant. In this embodiment a plurality of elongated perforations 44 are spaced from a liquid flow channel 46 which is folded back and forth (in this case, eight times) between an inlet port 48 and an outlet port 50. The internal member 42 could be a single machined piece or a laminated stack of similar sheets of sufficient thickness to provide the desired flow area. FIG. 5 is a fragmentary cross sectional view taken along line 5—5 of FIG. 4 showing the top face sheet 40, internal member 42 and a bottom face sheet 52.

Figure 6:
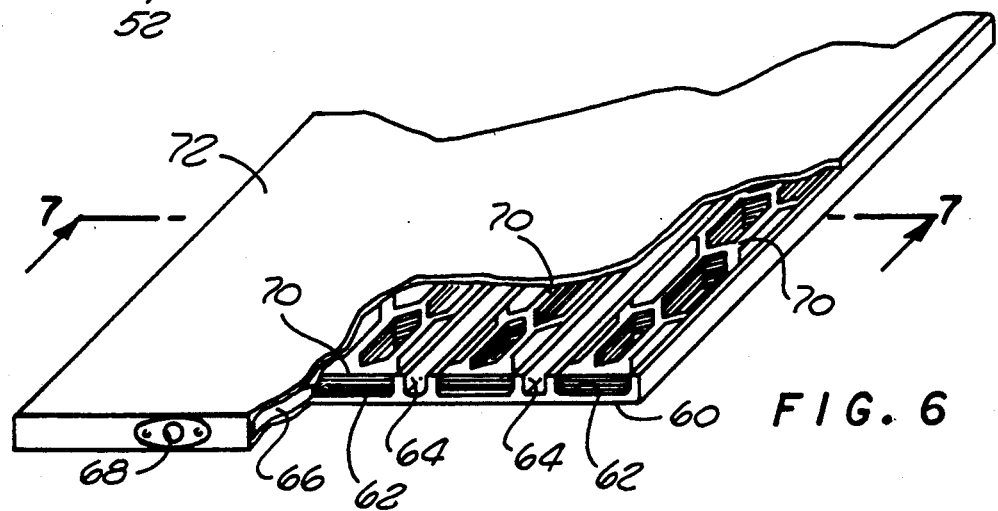
FIG. 6 is a perspective view, partly broken away, of another embodiment of my invention.

FIG. 6 is a perspective view, shown partly broken away, of another embodiment of my invention wherein the lower face member 60 is an etched or machined plate of significant thickness formed with a plurality of alternating wide and narrow channels 62, 64 respectively, each opening into a hollowed out manifold section 66. An inlet port 68 connects manifold section 66 with a source of fluid. An outlet port (not shown) may be located at the opposite end of the panel. The narrow channels 64 are fluid channels which communicate manifold 66 and inlet port 68 with the outlet port. Filling each of the wide channels 62 is a stack 70 of perforated strip members which may be laminated as a stack before being placed in channels 62, or they may be individually laid in channels 62. A face sheet 72 is then placed on the top of the assembly which is then brazed together to fabricate an integrated panel.

Figure 7:
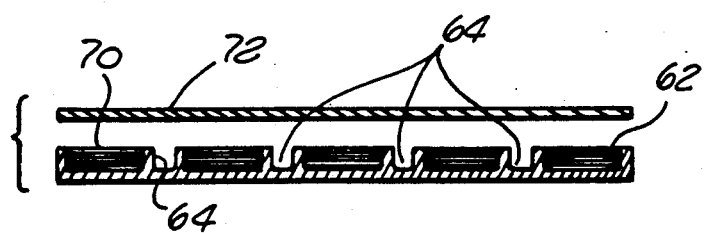
FIG. 7 is a sectional view taken along line 7—7 of FIG. 6.

FIG. 7 is a sectional view taken along line 7—7 of FIG. 6 and shows lower face member 60, upper face sheet 72 (unattached in this view), channels 62 with stacks 70 of perforated strip members and fluid channels 64. As will be apparent to those skilled in the art, the fluid channels 62 may each terminate in a manifold like manifold 60 or the structure shown in FIGS. 6 and 7 may be made with channels 64 interconnected as in FIG. 4. Many other configurations or perforations with or without fluid channels are possible depending upon requirements. The teachings herein also contemplate that panels may be made with such a large percentage of their volume in vacuum filled cells that the panels will float in water.

Laminated panels such as those described above are formed essentially as follows in the case of panels of aluminum alloy. The stack when assembled as desired is then placed in an oven and initially subjected to a vacuum such as 200 microns at which time the oven is backfilled with an inert gas to remove most of the oxygen. At this time the oven is heated to approximately 225° F. plus or minus 20° F. The vacuum is then increased to about $10^{-5}$ Torr and the temperature raised to a brazing temperature which in the case of the aluminum and aluminum brazing material is about 1100° F. When the stack has reached an average temperature of 1100° F. The oven is turned off and the stack permitted to cool slowly to 1065° F. or lower, at which time the stack can be removed from the oven. The brazing process itself is known and those skilled in the art will be able to select suitable temperatures and various readings for brazing other materials.

Laminated panels as described can be fabricated of titanium or titanium alloys with aluminum brazing material, of stainless steel with silver brazing material, of nickel with nickel or aluminum brazing material, and others. This listing is exemplary only and not intended to be exhaustive. Dissimilar metals and cladded metals might be chosen where special characteristics are required, e.g., where high strength is required in combination with resistance to high temperatures and corrosion, a nickel alloy face sheet, a nickel alloy perforated core material and a titanium face sheet with gold brazing alloy material may be used. Other such combination of metals and cladding materials include nickel alloy such as Inconel clad with silver, stainless steel clad with aluminum or titanium clad with aluminum.

The resulting laminated panel may then be further formed as desired and heat treated. The density of the laminate is controllable within a wide range by varying the number and pattern of perforations, per sheet and the number of perforated sheets. It is also possible to form fluid channels in the internal layers for cooling or for the transfer of hydraulic fluid. Also, some internal sheets may be unperforated if additional stiffness or isolation of the entrained spaces is desired. Normally the edges of the internal sheets are left solid and are brazed to provide an integral frame as compared with a honeycomb structure wherein the frame is bonded or riveted to the honeycomb core.

The laminated structure described above provides additional benefits in that structural loading is uninterrupted and evenly distributed from the outside edges to the center of the panel and by arranging the panels with the granular structure or grain of individual panels at right angles or non-parallel to each other, overall structural integrity is improved.

Those skilled in the art will recognize that many possible configurations of panels are possible utilizing the teachings herein. Stiffness and density are variable depending upon the number of intermediate perforated layers and the pattern of perforations in such layers. Various materials and combinations of materials are possible as set forth above; consequently, I do not desire to be limited to the embodiments described but only by the following claims as interpreted with the benefit of the doctrine of equivalents.

What is claimed is:

1. A method of producing laminated structural panels comprising the steps of:
    a) starting with a plurality of sheets of sheet metal perforated with a desired pattern;
    b) providing imperforate top and bottom metal sheets;
    c) providing brazing material at the interface between said metal sheets;
    d) stacking said sheets with said perforated sheets aligned to provide desired areas of contact with the unperforated parts thereof and placed between said top and bottom sheets;
    e) placing said stack in an oven and subjecting it to an initial vacuum of at least 200 microns and backfilling said oven with an inert gas;
    f) increasing the vacuum to approximately $1 \times 10^{-5}$ Torr and increasing temperature to an amount sufficient to braze said stacked sheets and vacuum seal the panels;
    g) permitting the stack to cool in said oven to a temperature significantly below said brazing temperature; and h) removing said stack from said oven.

2. The method as claimed in claim 1 wherein following step g), said stack is formed as desired by rolling, bending or stamping.

3. The method as claimed in claim 1 wherein following step g) said stack is formed as desired by welding or sawing.

4. A method as claimed in claim 1 wherein said top and bottom metal sheets are of nickel alloys.

5. A method as claimed in claim 1 wherein said top and bottom metal sheets are of a stainless steel alloy and said brazing material is of silver.

6. The method as claimed in claim 1 wherein at least some of said sheets are formed with cladded brazing material.

7. A method as claimed in claim 6 wherein said top and bottom metal sheets plates are of titanium.

8. A method as claimed in claim 6 wherein said top and bottom sheets are clad with aluminum brazing material.

9. A method of making a laminated structure comprising the steps of:
a) providing a plurality of center plates of aluminum alloy formed to define a plurality of spaces therein and aluminum brazing material on said center plates;
b) providing top and bottom face plates of material capable of being brazed to aluminum;
c) aligning said center plates to provide desired areas of contact with the unperforated portions thereof and stacking said aligned center plates between said face plates;
d) forming a substantial vacuum at the adjoining surfaces of said plates; and
e) subjecting said plates while in said vacuum environment to a pressure and temperature sufficient to effect diffusion bonding of said plates and vacuum seal the laminated structure.

10. A method as claimed in claim 9 wherein said brazing material is in the form of aluminum brazing foil.

11. A method of making a laminated structure as set forth in claim 9 wherein said brazing material constitutes layers of aluminum brazing foil placed between said plates.

12. A laminated structural panel comprising:
a plurality of sheets of sheet metal perforated with a desired pattern, aligned to provide desired areas of contact with the unperforated parts thereof, and stacked to provide a desired pattern of openings;
top and bottom imperforate face sheets stacked with said perforated sheets and with brazing material at the interface between said perforated and face sheets, said perforated and face sheets being brazed together in a high vacuum environment and at a temperature sufficient to melt said brazing material and vacuum seal the panel.

13. A laminated structural panel as claimed in claim 12 wherein the perforations of said perforated sheets are stacked to define at least one fluid channel through said panel.

14. A laminated structural panel as claimed in claim 12 wherein said sheets of sheet metal are of aluminum alloy and said brazing material is aluminum.

15. A laminated structural panel as claimed in claim 12 wherein said imperforate sheets of sheet metal are of titanium, said perforate sheets are aluminum alloy and said brazing material is aluminum.

16. A laminated structural panel as claimed in claim 12 wherein said sheets of metal include a plurality of perforated aluminum alloy interior sheets and unperforated face sheets of nickel alloy.

17. A laminated structural panel as claimed in claim 12 wherein said sheets of metal include a perforated aluminum alloy interior sheets and two face sheets, at least one of which is of a metal other than aluminum alloy.

18. A laminated structural panel as claimed in claim 12 wherein the periphery of said perforated sheets are imperforate, thus resulting in a peripheral frame of laminated solid metal.

19. A laminated structural panel as claimed in claim 12 wherein said sheets of sheet metal are of stainless steel alloy and said brazing material is of silver.

20. A laminated structural panel as claimed in claim 12 wherein said sheets of sheet metal are of nickel alloy with nickel brazing material.

21. A laminated structural panel as claimed in claim 12 wherein the perforations in at least some of said perforated sheets are aligned to provide contained spaces having greater depth than the thickness of one sheet.

22. A laminated structural panel as claimed in claim 12 wherein the perforations in said perforated sheets are misaligned such that the depth of the contained spaces are not significantly greater than the thickness of one sheet.

23. A laminated structural panel as claimed in claim 12 wherein an imperforate sheet of the same material as said perforate sheets is placed between at least two of said perforate sheets.

24. A laminated structural panel as claimed in claim 12 wherein at least some of said sheets have a granular structure and at least one of said sheets is stacked with its granular structure non-parallel to the granular structure of others of said sheets.

25. A laminated structural panel as claimed in claim 12 wherein one of said imperforate face sheets is formed with channels on one surface thereof and stacks of said perforated sheets are carried in at least some of said channels.

* * * * *